(12) United States Patent
Umeda et al.

(10) Patent No.: US 6,222,295 B1
(45) Date of Patent: Apr. 24, 2001

(54) STATOR WINDING OF VEHICLE AC GENERATOR

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,963

(22) Filed: Sep. 29, 1999

(30) Foreign Application Priority Data

Oct. 9, 1998 (JP) .................................................. 10-288188

(51) Int. Cl.[7] .............................. H02K 3/32; H02K 1/22; H02K 3/04
(52) U.S. Cl. ........................... 310/179; 310/180; 310/201
(58) Field of Search .................................. 310/179–180, 310/201, 206, 260; 29/596–598

(56) References Cited

U.S. PATENT DOCUMENTS

| 1,826,295 | * | 10/1931 | Apple | 310/206 |
| 2,407,935 | * | 9/1946 | Perfetti et al. | 310/206 |
| 3,860,744 | * | 1/1975 | Schuler | 174/117 FF |
| 5,936,326 | * | 8/1999 | Umeda et al. | 310/179 |
| 5,982,068 | * | 11/1999 | Umeda et al. | 310/206 |
| 5,986,375 | * | 11/1999 | Umeda et al. | 310/180 |
| 5,986,380 | * | 11/1999 | Kaminski et al. | 310/270 |

FOREIGN PATENT DOCUMENTS

| 881746 A2 | 12/1998 | (EP) . |
| 881747 A2 | 12/1998 | (EP) . |
| 92/06527 | 4/1992 | (WO) . |

* cited by examiner

*Primary Examiner*—Tran Nguyen
(74) *Attorney, Agent, or Firm*—Pillsbury Winthrop LLP

(57) ABSTRACT

In a stator winding of an AC generator for a vehicle, a plurality of sets of first and second conductor segments are disposed in the slots of a stator and connected to form the stator winding. Each of the first conductor segments has a turn portion having a large radius of curvature disposed at an axial end of the stator core, and each of the second conductor segments has a turn portion having a small radius of curvature disposed at an axial end. The second conductor segments have stronger insulation coating than the first conductor segments to improve insulation performance.

9 Claims, 4 Drawing Sheets

STATOR WINDING OF VEHICLE AC GENERATOR

CROSS REFERENCE TO RELATED APPLICATION

The present application is based on and claims priority from Japanese Patent Application Hei 10-288188, filed Oct. 9, 1998, the contents of which are incorporated herein by reference.

BACKGROUND OF THE INVENTION

1. Field of the Invention

The present invention relates to an AC generator for a vehicle and, particularly, a stator winding of such an AC generator.

2. Description of the Related Art

PCT application 92/06527 discloses a stator winding composed of a plurality of U-shaped conductor segments welded together. Such conductor segments have various turn portions having a different radius of curvature. Therefore, it is necessary to select coating material that is resistive to the most severe conditions such as stress applied while such conductor segments are formed by bending or high temperature generated while the stator winding is generating output power. However, the ratio of the insulation material to the production cost of such conductor segments is considerably high.

SUMMARY OF THE INVENTION

A main object of the invention is to provide an improved stator winding composed of a plurality of reliable conductor segments of high insulation performance which can be manufactured at a low production cost.

In a preferred embodiment of the invention, a stator winding of an AC generator includes a plurality of sets of first and second conductor segments disposed in slots of a stator and connected to form the stator winding. Each of the first conductor segments includes a turn portion having a large radius of curvature disposed at an axial end of the stator core, and each of the second conductor segments includes a turn portion having a small radius of curvature disposed at an axial end. That is, the turn portion of the second conductor segments has a smaller radius of curvature than the radius of curvature of the turn portion of the first conductor segments. The preferred embodiment has a feature in that the second conductor segments have stronger insulation coating than the first conductor segments, thereby improving insulation performance.

The first and second conductor segments may have stronger insulation coating at portions under higher temperature than other portions. The stronger insulation coating of the small U-turn portion can be provided by thicker coating than the coating of the large U-turn portion.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
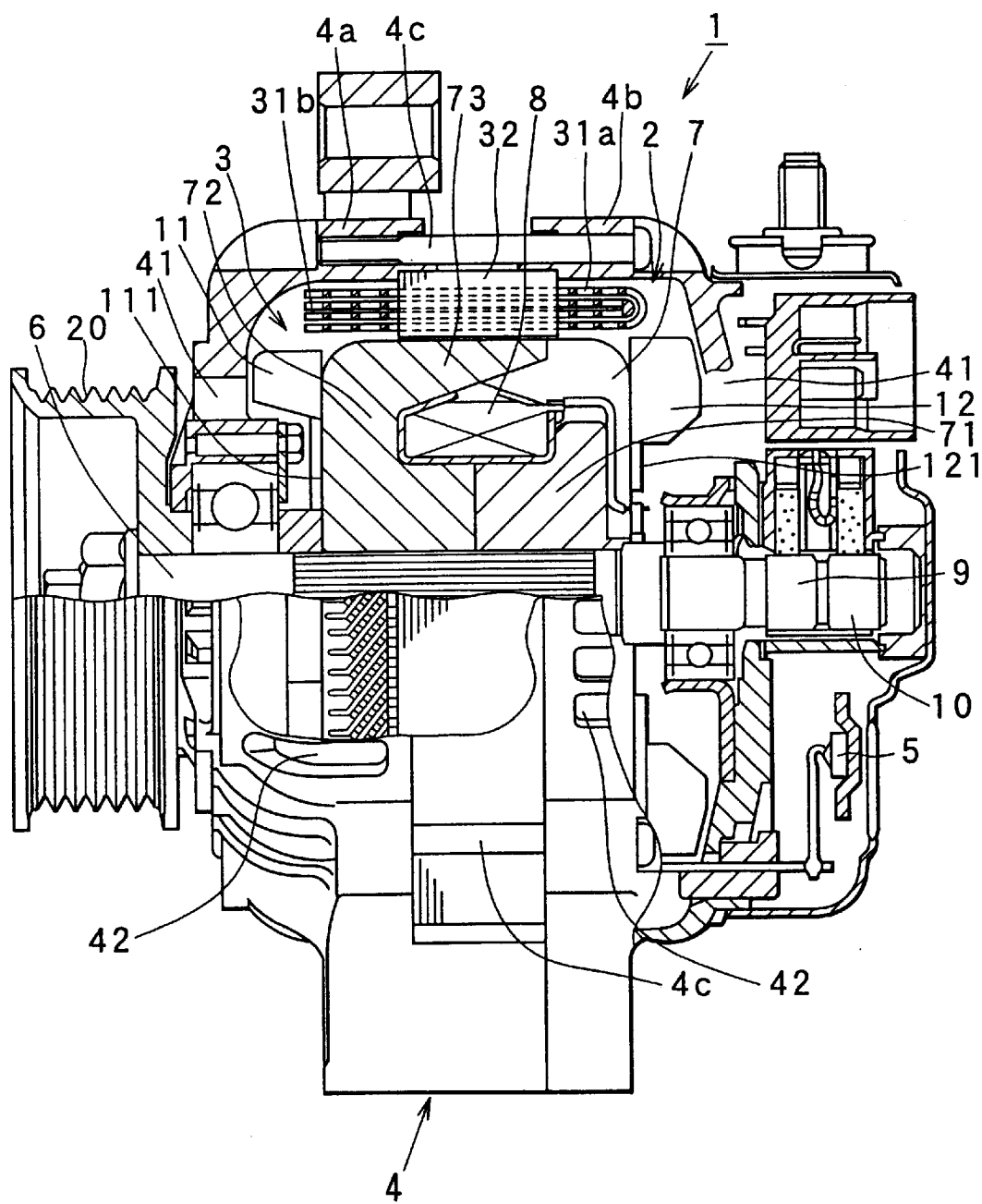
FIG. 1 is a cross-sectional view illustrating an AC generator for vehicle equipped with a stator winding according to a preferred embodiment of the invention.

In FIG. 1, AC generator 1 includes stator 2, rotor 3, housing 4 composed of front housing 4a and rear housing 4b, and rectifier unit 5. Rotor 3 has shaft 6, pole core unit 7, field coil 8, slip rings 9, 10, mixed-flow fan 11, and centrifugal fan 12. Shaft 6 has pulley 20 at an end to be driven by an engine via a belt.

Pole core unit 7 is composed of a pair of pole cores, each of which has boss portion 71, disk portion 72 and six claw poles 73 interleaved with six claw poles 73 of the other.

Mixed flow fan 11 has base plate 111 welded to the front end of pole core 7, and centrifugal fan 12 has base plate 121 welded to the rear end of pole core 7, which is the end remote from pulley 20.

Figure 2:
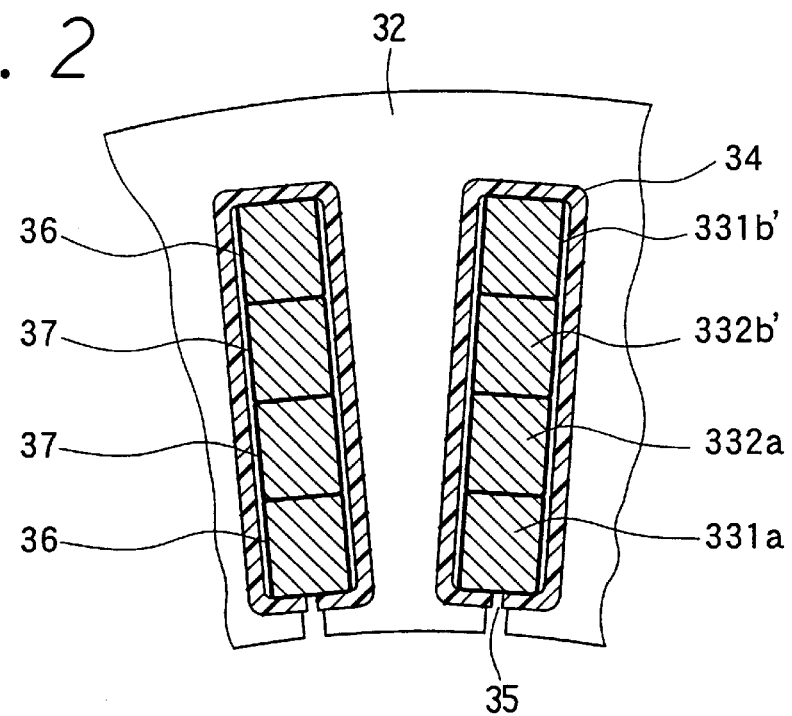
FIG. 2 is a fragmentary cross-sectional view of a stator with the stator winding disposed in slots according to the preferred embodiment.

Stator 2 is held between front and rear housings 4a and 4b and fastened by bolts 4c. Stator 2 is composed of cylindrical stator core 32, a three-phase stator winding and insulators disposed between stator core 32 and the stator winding. Stator core 32 has thirty six slots 35 formed at equal intervals in the inner periphery thereof. The stator winding has a plurality of in-slot portions 331a, 332a, 332b and 331b', as shown in FIG. 2.

Housing 4 has a plurality of air intake vents 41 at the axial ends thereof and a plurality of air discharge vents 42 at peripheral shoulders thereof to be opposed to first coil-end group 31a and second coil-end group 31b of the stator winding.

Rectifier unit 5 is located at the end of the housing remote from pulley 20 to correspond to first coil-end group 31a.

Figure 3:
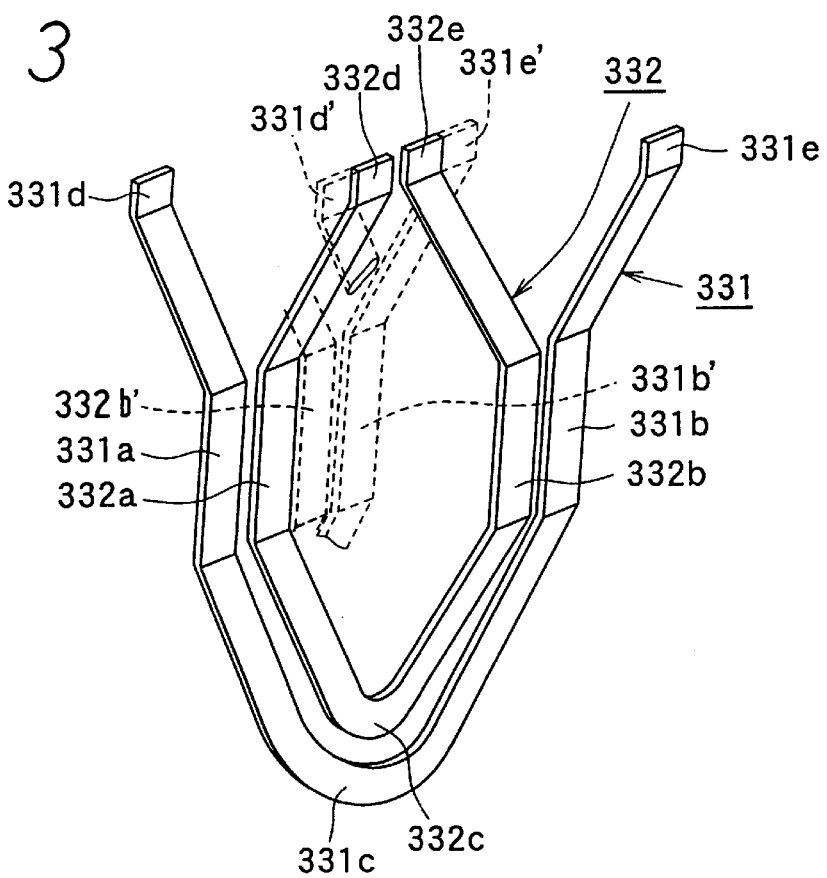
FIG. 3 is a schematic perspective view of a set of conductor segments of the stator winding according to the preferred embodiment.

As shown in FIG. 3, the stator winding has a plurality of sets of a U-shaped large segment 331 and a U-shaped small segment 332 surrounded by large segment 331. Large segment 331 is made of a rectangular copper wire covered with insulation coating 36 that is thicker than 20 μm and made of polyimide or other heat-resistive resinous material. Large segment 331 has a pair of in-slot portions 331a and 331b, turn portions 331c, and a pair of connection portions 331d and 331e. In-slot portion 331a is paired with in-slot portion 331b disposed in a slot one-pole pitch shifted right. In-slot portion 331b' and 332b ' are likewise paired with in-slot portions respectively disposed in a slot at one-pole pitch shifted left. Connection portion 331d and 331e are located at the ends of the legs thereof inclined to open the legs in the circumferential direction to be spaced apart by one pole pitch from each other, so that each of them can be positioned at a side of a connection portion of another small segment.

Small segment 332 is also made of a rectangular copper wire covered with the same insulation coating 37 that is thicker than large segment 331. Small segment 332 has a pair of in-slot portions 332a and 332b, turn portion 332c, and a pair of connection portions 332d and 332e. Connection portions 332d and 332e are located at the ends of the legs thereof inclined to close the legs in the circumferential direction, so that connection portion 332d can be positioned at a side of connection portion 331d of a large segment and connection portion 332e can be positioned at a side of connection portion 331e' of a large segment as shown in FIG. 3.

Figure 4:
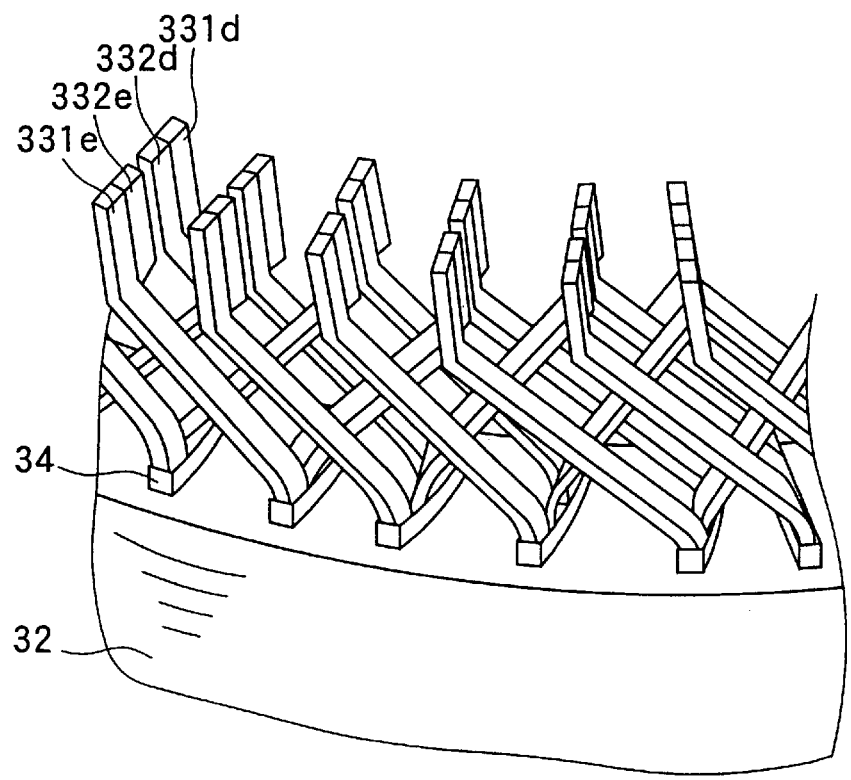
FIG. 4 is a fragmentary perspective view of a coil end group of the stator winding according to the preferred embodiment.
Figure 5:
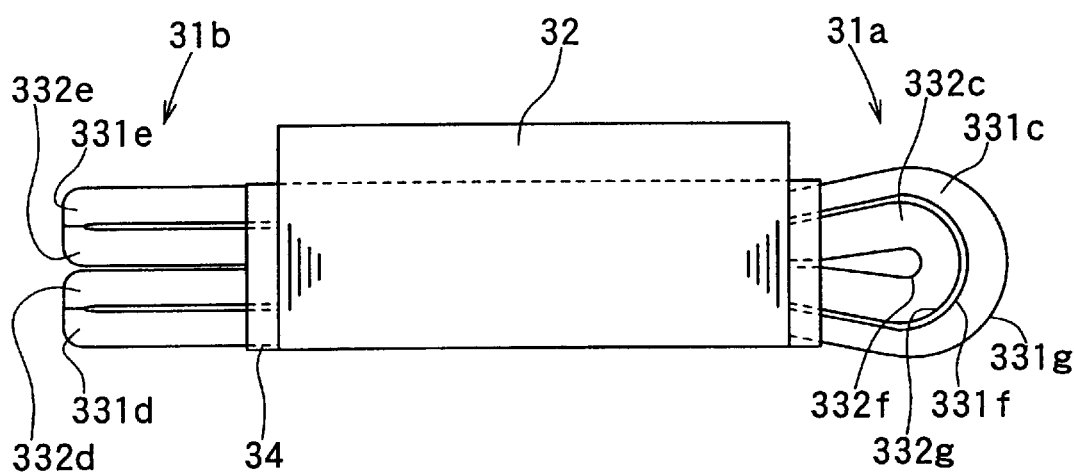
FIG. 5 is a fragmentary schematic side view of a stator having the stator winding shown in FIG. 4.

These sets of large and small segments are connected to one another at the connection portions to form the stator winding as shown in FIGS. 3–5.

When U-shaped large and small segments 331 and 332 are formed from rectangular conduction wire coated with insulation coating, the coatings of inside surfaces 331f, 332f of turn portions 331c, 332c shown in FIG. 5 are contracted, and the coatings of outside surfaces 331g, 332g are expanded. The radius of the curvature of small segment 332 at inside surface 332f is about a half of the radial thickness thereof. Stress applied to the coating of the small segment is larger than the stress applied to the large segment. However, because the small segments 332 are covered with thicker insulator coatings 37 than the large segment 331 covered with insulation coatings 36 at the turn portions, the small segments can be insulated as surely as the large segments. The cross-sectional area of the conductive material of small segment 331 at the turn portion is the same as that of large segment 332.

The insulation coating 37 covering small segment 332 can be made more heat resistant than the coating 36 of the large segment 331, so that the thickness of the coatings 37, 36 of both small and large segments 332, 331 can be made equal.

Figure 6:
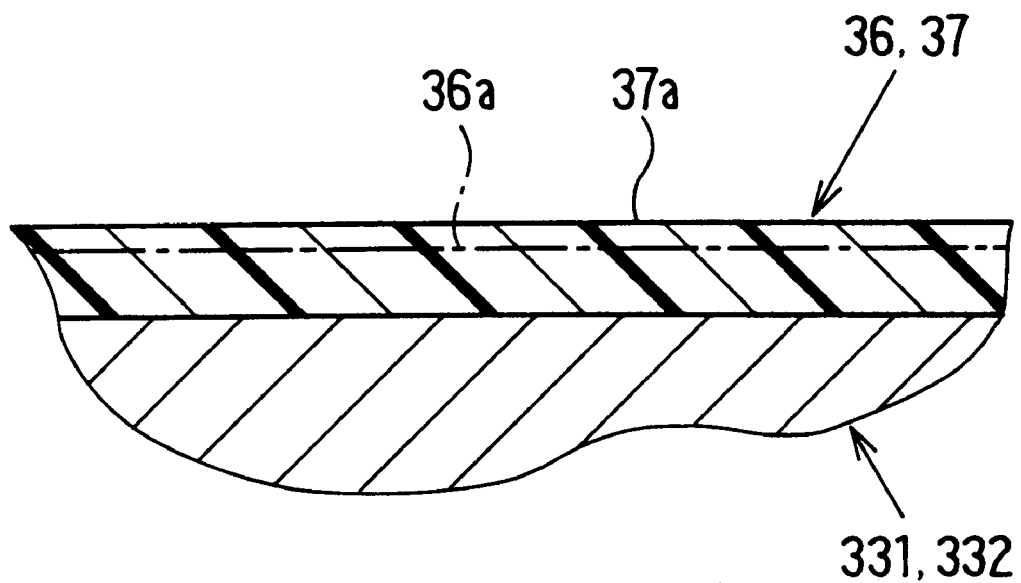
FIG. 6 is a fragmentary schematic view illustrating a segment with coating.

As illustrated in FIG. 6, coating 37a applied to small segment 37 is preferably thicker than coating 36a of large segment 36.

The large segment 331 can be formed of a larger rectangular wire in cross-section than small segment 332 to equalize the electric resistance of the turn portion. Coating 36 of large segment 331 can be as thick as coating 37 of small segment 332. If large segments 331 are formed of rectangular wires having different cross-section, thicker coating is preferably applied to the segment having larger cross-section.

Additional heat resistive coating may be applied to portions of the large or the small segment where the temperature thereof becomes higher than other portions.

Turn portion 332c of small segment 332 can have a smaller cross section than turn portion 331c of large segment 331, so that difference in the stress between them can be reduced.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator winding of an AC generator for a vehicle including a stator core having a plurality of slots, wherein
said stator winding comprises a plurality of sets of first and second conductor segments disposed in said slots and connected to form said stator winding,
each of said first conductor segments comprises a turn portion having a first radius of curvature disposed at an axial end of said stator core,
each of said second conductor segments comprises a turn portion having a second radius of curvature smaller than said first radius of curvature disposed at an axial end, and
said second conductor segments have a stronger insulation coating than said first conductor segments.

2. The stator winding as claimed in claim 1, wherein
said first and second conductor segments have stronger insulation coating at portions heated at higher temperature than other portions.

3. The stator winding as claimed in claim 2, wherein
said coating is made of heat-resistive material.

4. The stator winding as claimed in claim 1, wherein
said stronger insulation coating comprises a thicker coating than said first U-turn portion.

5. A stator winding of an AC generator for a vehicle including a stator core having a plurality of slots, wherein
said stator winding comprises a plurality of sets of outer and inner U-shaped conductor segments disposed in said slots and connected to form said stator winding,
each of said outer conductor segments comprises a first U-turn portion disposed at an axial end of said stator core and a pair of straight portions respectively extending from said first U-turn portion to be disposed in said slots,
each of said inner conductor segments comprises a second U-turn portion smaller than said first U-turn portion disposed at said axial end to be surrounded by one of said outer conductor segments and a pair of straight portions respectively extending from said first U-turn portion to be disposed in said slots, and
said second U-turn portion has a stronger insulation coating than said first U-turn portion.

6. A stator winding of an AC generator for a vehicle including a stator core having a plurality of slots, wherein
said stator winding comprises a plurality of sets of first and second conductor segments having different thicknesses disposed in said slots and connected to form said stator winding,
each of said first and second conductor segments comprises a turn portion disposed at an axial end of said stator core, and
said first conductor segments are thicker than said second conductor segments and have a stronger insulation coating at said turn portion than said second conductor segments.

7. The stator winding as claimed in claim 6, wherein
said first conductor segments have a thicker insulation coating at said turn portion than said second conductor segments.

8. The stator winding as claimed in claim 6, wherein
said stronger insulation coating is made of heat-resistive material.

9. A stator winding of an AC generator for a vehicle including a stator core having a plurality of slots, wherein
said stator winding comprises a plurality of sets of outer and inner U-shaped conductor segments disposed in said slots and connected to form said stator winding,
each of said outer conductor segments comprises a first U-turn portion disposed at an axial end of said stator core and a pair of straight portions respectively extending from said first U-turn portion to be disposed in said slots,
each of said inner conductor segments comprises a second U-turn portion smaller than said first conductor segments disposed at said axial end to be surrounded by one of said outer conductor segments and a pair of straight portions respectively extending from said first U-turn portion to be disposed in said slots, and said first U-turn portion has larger cross-section than said second U-turn portion.

* * * * *